Jan. 20, 1925.
W. L. WEBER
1,523,924
AUTOMOBILE SPOTLIGHT MOUNTING
Filed July 5, 1923
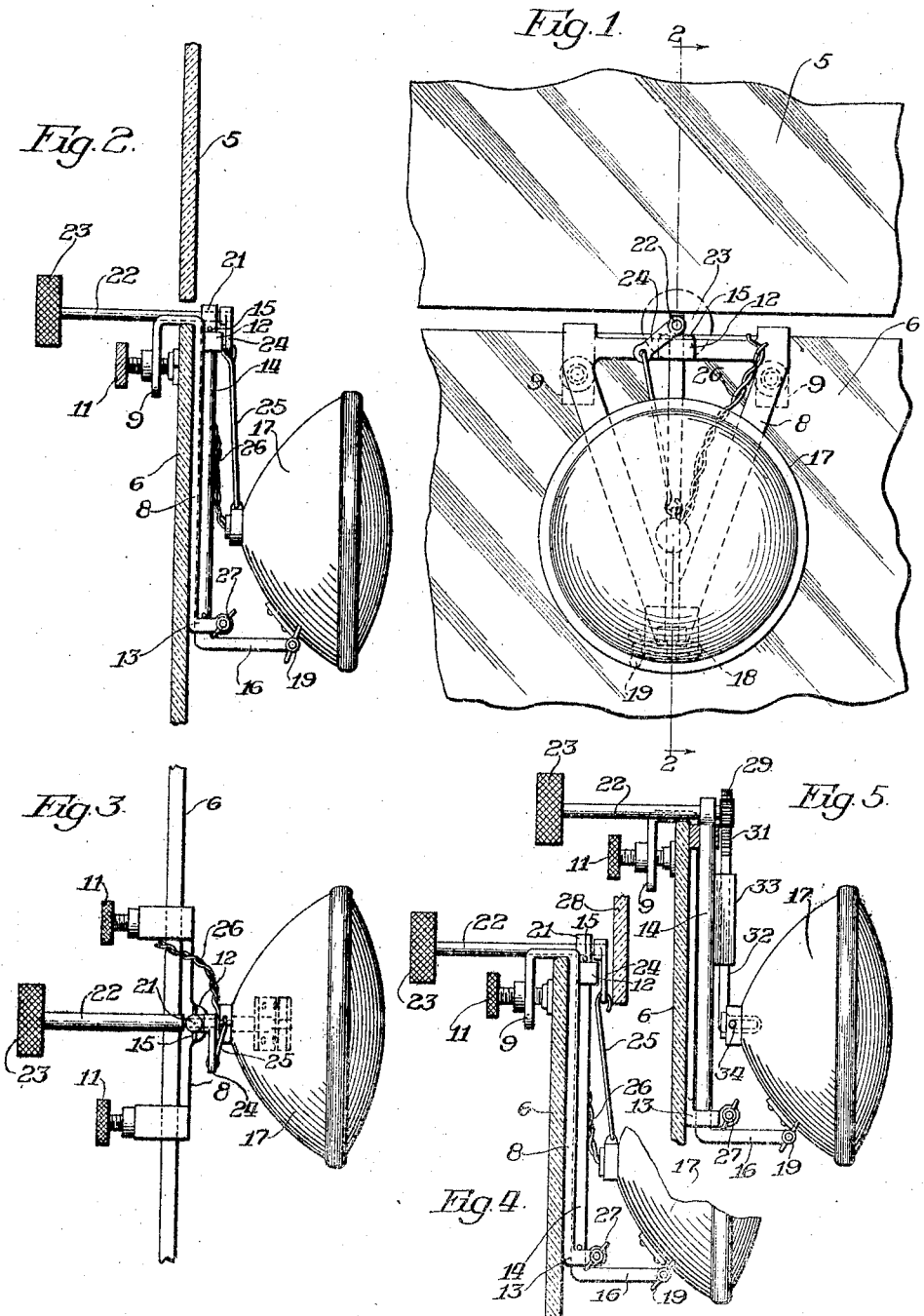
Inventor:
William L. Weber
By Chas. J. Wilson, Atty.

Patented Jan. 20, 1925.

1,523,924

UNITED STATES PATENT OFFICE.

WILLIAM L. WEBER, OF CHICAGO, ILLINOIS.

AUTOMOBILE SPOTLIGHT MOUNTING.

Application filed July 5, 1923. Serial No. 649,419.

*To all whom it may concern:*

Be it known that I, WILLIAM L. WEBER, a citizen of the United States, residing at Chicago, in the county of Cook and State of Illinois, have invented certain new and useful Improvements in Automobile Spotlight Mountings, of which the following is a specification.

This invention pertains to dirigible lights, and while capable of many uses, is particularly adapted as a spotlight for automobiles.

Spotlights of this character, so far as I am aware, have heretofore either been mounted entirely outside the body of the car, so that they must be operated from outside the car; or they have been mounted in the glass of the windshield, which necessitated the cutting of an opening in the windshield.

My present invention aims to provide a spotlight which can be supported on the windshield in convenient position, and which can be manipulated from inside the car to direct the rays from the light in any desired direction, all without cutting a hole through or otherwise marring or disfiguring the windshield.

Another purpose of my invention is to provide a light of the character indicated which can be readily attached to a windshield by unskilled labor and without the employment of special tools, and which can be adjusted thereon to any desired position transversely of the windshield by the driver of the car.

Other objects are to provide a spotlight mounting which will be light, simple in construction, economical to manufacture, one which will be durable, and which can be readily manipulated from inside the car.

For the purpose of facilitating an understanding of my invention, I have illustrated on the accompanying drawings preferred embodiments thereof, from an inspection of which, when considered in connection with the following description, my invention and many of its inherent advantages should be readily appreciated.

Referring to the drawings:

Fig. 1 is a front elevation showing my invention applied to a windshield;

Fig. 2 is a sectional view on the line 2—2 of Fig. 1;

Fig. 3 is a plan view with the upper section of the windshield removed;

Fig. 4 is a fragmentary view similar to Fig. 2, illustrating the application of my invention to another type of windshield; and Fig. 5 is a similar view of a modified form of my invention.

Referring to the drawings more in detail, reference character 5 indicates the upper section, and 6 the lower section of a windshield of the type wherein the upper and lower sections are normally in vertical alignment with a limited space between their opposed edges, in which a rubber filler strip is customarily disposed. When my invention is applied to the windshield, a portion of this strip is preferably removed.

My invention, as illustrated, comprises a bracket 8, preferably shaped somewhat like the letter A inverted, the upper ends of the legs being bent rearwardly and then downwardly, as indicated at 9, forming hooks or clips adapted to engage the upper edge of the lower section of the windshield. These legs, and in fact, the whole bracket, may if desired be made of spring material adapted to yieldingly clamp the upper edge of the windshield section to hold the bracket in position; but preferably, the frame is made of somewhat rigid material and each leg is equipped with a rubber tipped set screw 11, which may be tightened against the rear face of the windshield to clamp the bracket in position. The bracket depends upon the front face of the windshield and is provided with vertically aligned sockets or journals 12 and 13, in which is rotatably mounted a post 14, suspended by a pin 15 or collar engaging one of the journals. At its lower end the post is provided with a radially extending arm 16 which carries the light 17. A bolt 18 serves as a pivotal connection between the light and the arm 16, and a wing nut 19 thereon may be adjusted to impose the requisite friction upon the connection so that the light will remain in any position to which it has been tilted about the bolt 18 as a fulcrum.

The upper end of the post 14 is provided with an eye or bearing 21, in which is journaled a small shaft 22 extending rearwardly between the windshield sections and equipped at its inner end in accessible position to the driver of the car with a knurled knob 23, by which the shaft or rod may be rotated.

In the form of the invention shown in Figs. 1 to 4, inclusive, the outer end of the rod 22 is provided with an arm 24, which is connected with the light 17 rearwardly of the pivot 18 by means of a link 25. The cord 26 for the light may extend upwardly through the opening between the windshield sections and may be equipped with a switch inside the car body; or, if preferred, it may extend downwardly and into the body beneath the windshield.

My invention may be applied to the windshield by swinging the upper section outwardly and hanging the bracket upon the upper edge of the lower section in any desired position transversely of the car. It is then clamped in position by tightening the set screws 11. To swing the light horizontally, the driver grasps the rear end of the rod 22 and swings the same horizontally, thereby swinging the post 14 to carry the light in an arc about the post as an axis. In order that the light will remain in any horizontal position to which it may be adjusted, the journal 13 is preferably split and provided with a clamping bolt equipped with a wing nut 27, which may be tightened sufficiently to frictionally hold the post in adjusted position, while still permitting swinging adjustment of the same through the instrumentality of the rod 22. When vertical tilting movement of the light is desired, this may be accomplished by rotating the rod 22 by means of the knob 23, thereby swinging the arm 24 upwardly or downwardly, as the case may be, to tilt the light vertically about the fulcrum pin 18.

In Fig. 4 the upper section 28 of the windshield is shown as overlapping the lower section instead of being disposed in alignment therewith; but since in this type of windshield the clearance between the opposed faces of the upper and lower windshield sections is sufficient to accommodate the light controlling mechanism, as illustrated in Fig. 4, it will be apparent that my invention is equally applicable to this type of windshield, and may therefore be applied without change to either this type or the type disclosed in Figs. 1 to 3, inclusive.

In Fig. 5 the rod 22, instead of being equipped with an arm 24, is provided at its outer end with a pinion 29, which meshes with a rack 21 formed on a bar 32, slidably mounted in a guide 33 carried by the post 14, and the lower end of this bar is connected by a pin and slot connection 34 with the back of the light. It will be apparent that in this instance also, rotative movements of the rod 22 will cause the light to be tilted vertically.

Various other modifications in the structural details may obviously be resorted to without departing from the essence of my invention, as defined in the following claims.

I claim:

1. The combination, with a windshield comprising upper and lower sections spaced apart, of a bracket suspended from the upper edge of the lower section and disposed on the outer face of said windshield, a post rotatably carried by said bracket and provided at its lower end with a radially extending arm, a spotlight pivotally mounted on said arm, a shaft journaled in the upper end of said post and extending rearwardly through the opening between said windshield sections, swinging movements of said shaft about the axis of the post in the center being adapted to swing said light from side to side, a crank arm on the outer end of said shaft, and a connection between said crank arm and said spotlight whereby said spotlight will be tilted vertically upon rotation of said shaft.

2. The combination with a windshield comprising upper and lower sections spaced apart, of a spotlight suspended from the upper edge of and supported by the lower section of said windshield, and means extending through the space between said windshield sections whereby the position of said spotlight may be adjusted from within the car.

3. The combination with a windshield comprising upper and lower sections spaced apart, of a spotlight mounted in front of the lower section of said windshield, and means extending through the space between said windshield sections and operable from the rear of said windshield for adjusting said spotlight vertically and horizontally.

4. The combination with a windshield comprising upper and lower sections spaced apart, of a bracket attached to one of the sections of said windshield, a post rotatably carried by said bracket in front of the windshield, a spotlight pivotally supported on said post, and means extending through the space between said windshield sections and operable from the rear of said windshield for oscillating said post to swing said light horizontally and for tilting said light vertically.

5. The combination with a sectional windshield, of a bracket connected to one of said sections, a vertically disposed pivot post carried by said bracket forwardly of the windshield and provided with a radially extending arm, a spotlight pivotally mounted on said arm, a member connected to the upper end of said post and projecting through the space between the windshield sections in position to be operated from within the car, swinging movement of said member being adapted to oscillate said post to swing the light horizontally, said member being rotatable relatively to the post, and a connection between said member and said light whereby said light may be tilted vertically upon rotation of said member.

WILLIAM L. WEBER.